Oct. 16, 1923.  1,470,970
A. R. GROFF
FRONT FENDER BRACE
Filed Oct. 17, 1921
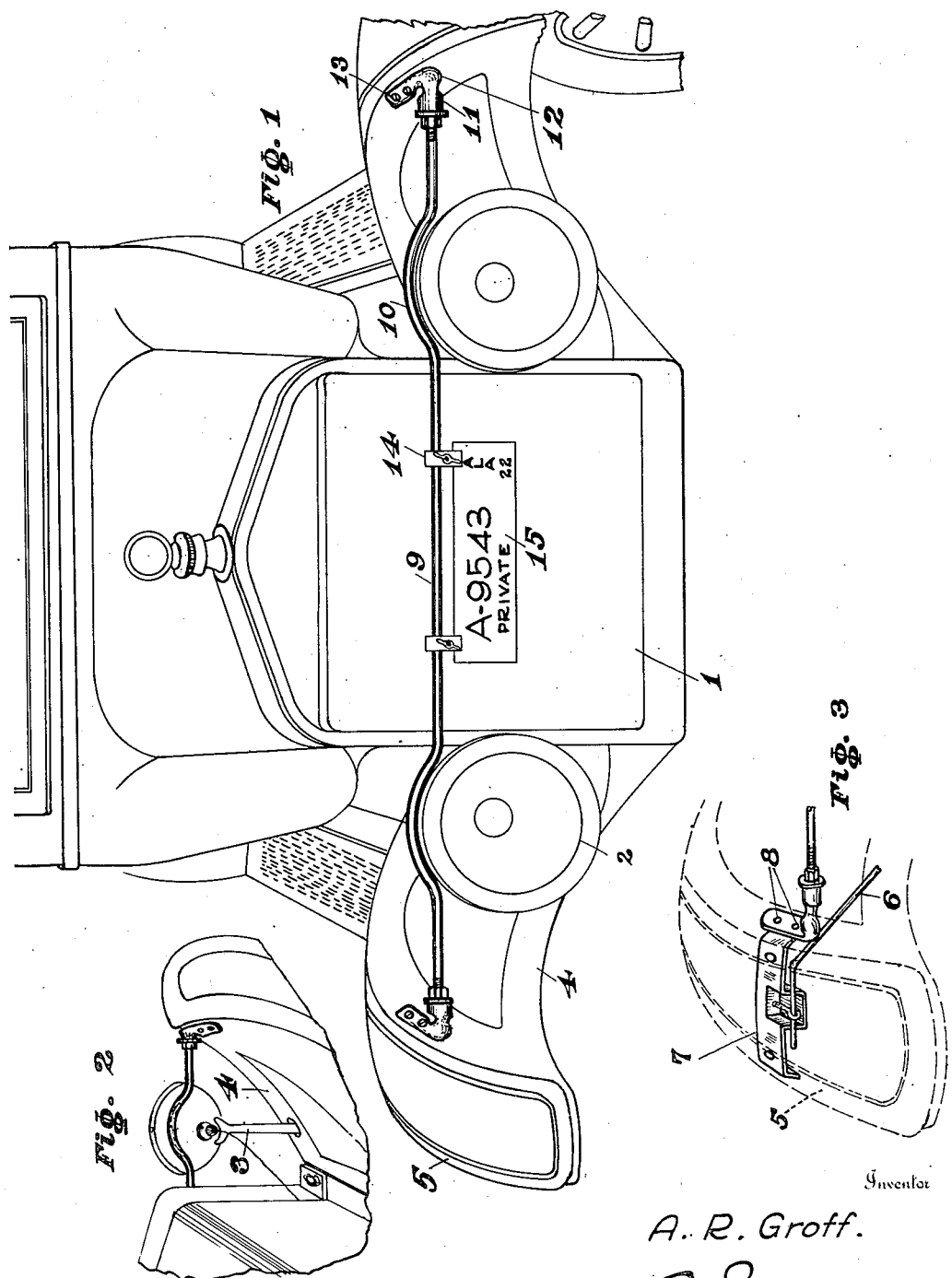
Inventor
A. R. Groff.
By
Attorney Patented Oct. 16, 1923.

1,470,970

UNITED STATES PATENT OFFICE.

ANGUS R. GROFF, OF BIRMINGHAM, ALABAMA.

FRONT-FENDER BRACE.

Application filed October 17, 1921. Serial No. 508,284.

*To all whom it may concern:*

Be it known that I, ANGUS R. GROFF, a citizen of the United States of America, residing at Birmingham, in the county of Jefferson and State of Alabama, have invented certain new and useful Improvements in Front-Fender Braces, of which the following is a specification.

My invention relates to a front fender brace for automobiles which is adapted to serve as a license or name plate support and which is especially designed to serve as a truss and to function without objectionable vibration.

It is a distinctive feature of my invention that this brace is especially adapted to the front fenders of Ford automobiles and it is arranged to avoid interference with the lamps and radiator and to have a firm and rigid attachment to the present front fender supporting elements. By the provision of such a brace, with its direct connection to the front fender supports, the fenders are not only braced together but by their cross connection serve to very greatly strengthen the supports to the running boards and to tie the whole front end to the fender and running board elements together.

My invention in its preferred embodiment will be best understood by reference to the accompanying drawings, which form a part of this specification, and in which:—

Fig. 1 is a partial front view showing the fender brace applied and omitting a showing of the wheels.

Fig. 2 is a fragmental rear view illustrating one end of the fender brace.

Fig. 3 is a detail view showing the fender in dotted lines and illustrating the manner of attachment of the fender brace to the fender supporting elements carried by the chassis.

Similar reference numerals refer to similar parts throughout the drawings.

In the embodiment of my invention illustrated, I have shown the same applied to an automobile of the Ford type which is equipped with a radiator 1, lamps 2, lamp brackets 3 and with aprons 4 for the front fenders 5. In accordance with the present practice, the fenders at their forward ends are supported by brackets 6 attached to the chassis and carrying at their upper ends a plate 7 which is riveted to the top of the fender and underlies the upper end of the apron and is connected thereto by two rivet holes opposite the openings 8 in Fig. 3. All of the parts as thus far described are standard parts of the present Ford equipment.

My invention comprises a transverse brace rod or bar 9 which is bent upwardly to form an arch 10 at one side where it passes over the lamps 2. At their outer ends the bars are threaded and are screwed into the neck 11 of the attaching brackets 12. The body portion of this bracket is disposed in a plane substantially at right angles to its neck and it is shaped and designed to overlie the upper edge of the apron and to abut the under edge of the inside flange of the fender proper. This bracket body is provided with two openings 8 adapted to register with rivet holes in the fender plate 7 and apron, and in practice the rivets passing through the holes 8 of the plate and connecting the apron thereto are cut out and bolts 13 of proper length are substituted so as to connect the bracket 12 to the fender plate 7, thus obtaining for it a very firm and rigid connection to the fender and to the fender bracket 6, thereby most effectively reinforcing the supporting bracket for the fenders and bracing the latter. The straight middle portion of the brace is adapted to receive clamps 14, by means of which a name plate or license plate 15 can be suspended therefrom in position sufficiently in front of the radiator to avoid interference with the latter's efficient action. The arches 10 in the brace rod are important in that they adapt the brace to function more effectively as a truss and the arch in each end of the bar stiffens it sufficiently at that point to leave only the strength in front of the radiator, subject to variation, which is too short to be objectionable. In straight brace bars the vibration and resulting strains are such as to make them ineffective as a cross brace of the character under consideration. Moreover it is of importance that the cross brace, which should be directly connected to the fender brackets, does not attempt to brace the fenders by a connection to the lamp brackets which arrangement has not proven effective as a fender brace.

Having thus described my invention, what I claim as new and desire to secure by Letters Patent, is:—

1. The combination with the front fenders of an automobile having cross braces secured transversely of the under sides thereof and provided with apertures at their inner ends adapted to receive rivets for attachment to said braces to the depending aprons of the fenders, of angular bracket members having openings in one of the leg portions thereof adapted to be aligned with the usual rivet openings in the said fender aprons and the adjacent ends of said cross braces after the rivets have been removed therefrom, means adapted to be engaged through the said aligned openings for securing said bracket members and the adjacent ends of the said cross braces in position, and a brace rod extending between said bracket members and detachably secured at its ends to the free ends of the other of the leg portions thereof.

2. A front fender brace in accordance with claim 1, in which the brace rod is provided with intermediate curved portions disposed to clear the headlights of the automobile and to yieldingly resist longitudinal stresses on the brace rod.

In testimony whereof I affix my signature.

ANGUS R. GROFF.

Witness:
NOMIE WELSH.